US008007911B2

(12) United States Patent
Ito et al.

(10) Patent No.: US 8,007,911 B2
(45) Date of Patent: Aug. 30, 2011

(54) MATERIAL FOR ROOM TEMPERATURE CURABLE SOLVENT-BORNE OVERCOATING MATERIAL, COATING MATERIAL USING SAME AND COATING FILM

(75) Inventors: Kohzo Ito, Tokyo (JP); Jun Araki, Tokyo (JP); Tatsuya Suzuki, Isehara (JP); Masahiko Yamanaka, Isehara (JP); Kentarou Watanabe, Atsugi (JP)

(73) Assignees: Nissan Motor Co., Ltd., Yokohama-shi (JP); The University of Tokyo, Tokyo (JP)

( * ) Notice: Subject to any disclaimer, the term of this patent is extended or adjusted under 35 U.S.C. 154(b) by 14 days.

(21) Appl. No.: 12/083,099

(22) PCT Filed: Oct. 5, 2006

(86) PCT No.: PCT/JP2006/319969
§ 371 (c)(1),
(2), (4) Date: Apr. 4, 2008

(87) PCT Pub. No.: WO2007/040264
PCT Pub. Date: Apr. 12, 2007

(65) Prior Publication Data
US 2009/0047532 A1  Feb. 19, 2009

(30) Foreign Application Priority Data

Oct. 6, 2005 (JP) ................... 2005-293834
Oct. 6, 2005 (JP) ................... 2005-293835

(51) Int. Cl.
*C08B 37/16* (2006.01)
(52) U.S. Cl. ........ 428/413; 428/480; 428/522; 524/612; 525/54.2
(58) Field of Classification Search .................. 428/413, 428/480, 522; 524/612; 525/54.2
See application file for complete search history.

(56) References Cited

U.S. PATENT DOCUMENTS 6,828,378 B2 * 12/2004 Okumura et al. ............... 525/55
2003/0138398 A1  7/2003 Okumura et al.

FOREIGN PATENT DOCUMENTS

| CN | 1426424 A | 6/2003 |
|---|---|---|
| EP | 1 707 587 A1 | 10/2006 |
| EP | 1 710 269 A1 | 10/2006 |
| EP | 1710269 | * 11/2006 |
| EP | 1 734 066 A1 | 12/2006 |
| EP | 1 921 104 A1 | 5/2008 |
| JP | 6-29362 B2 | 4/1994 |
| JP | 2003-293146 A | 10/2003 |
| JP | 2004-131601 A | 4/2004 |
| JP | 2005-075979 A | 3/2005 |
| JP | 2005-143920 A | 6/2005 |
| JP | 2006/241396 A | 9/2006 |
| JP | 2007-091938 A | 4/2007 |
| JP | 2007-099988 A | 4/2007 |
| JP | 2007-099989 A | 4/2007 |
| JP | 2007-099990 A | 4/2007 |
| JP | 2007-099991 A | 4/2007 |
| JP | 2007-099993 A | 4/2007 |
| JP | 2007-099994 A | 4/2007 |
| JP | 2007-099995 A | 4/2007 |
| WO | WO-01/83566 A1 | 11/2001 |
| WO | WO 01/83566 A1 | 11/2001 |
| WO | WO-03/074099 A1 | 9/2003 |
| WO | WO 2005/080469 A1 | 9/2005 |
| WO | WO 2005-080470 A1 | 9/2005 |
| WO | WO 2005/095493 A1 | 10/2005 |
| WO | WO 2006/090819 A1 | 8/2006 |

OTHER PUBLICATIONS

J. Araki et al., "Preparation and Characterization of Various Polyrotaxane Derivatives for the Synthesis of Functional Slide-Ring Gels," Polymer Preprints, Japan, vol. 54, No. 2, 2005, pp. 2755-2756.
J. Araki et al., "Synthesis and Characterization of Polyrotaxane and Polyrotaxane Derivatives," Journal of Japan Society of Color Material, vol. 79, No. 7, 2006, pp. 290-295.
Office Action issued by Chinese Patent Office dated Aug. 21, 2009 for Chinese Patent Application No. 2006800367230.

* cited by examiner

*Primary Examiner* — Alicia Chevalier
(74) *Attorney, Agent, or Firm* — Foley & Lardner LLP

(57) ABSTRACT

To provide a coating material for a room temperature curable solvent-borne overcoating material having chipping resistance and not allowing occurrence of cracks, and a room temperature curable solvent-borne overcoating material using the same, the room temperature curable solvent-borne overcoating material being excellent in abrasion resistance and in performance such as weather resistance, contamination resistance and adhesion.
A coating material is formed of a lipophilic polyrotaxane including a cyclic molecule, a linear molecule piercing through the cyclic molecule to include it, and blocking groups disposed at both end terminals of the linear molecule to prevent departure of the cyclic molecule. In the lipophilic polyrotaxane, at least one of the linear molecule and the cyclic molecule has a hydrophobic modification group. A room temperature curable solvent-borne overcoating material is formed to contain the coating material preferably within a range of from 60 to 100% by mass relative to a film-forming component.

20 Claims, 2 Drawing Sheets

MATERIAL FOR ROOM TEMPERATURE CURABLE SOLVENT-BORNE OVERCOATING MATERIAL, COATING MATERIAL USING SAME AND COATING FILM

TECHNICAL FIELD

The present invention relates to a material for a room temperature curable solvent-borne overcoating material, a coating material using the same and a coating film thereof, and more particularly to a material for a room temperature curable solvent-borne overcoating material applicable to products employed in a field requiring an abrasion resistance particularly, such as: vehicle bodies; indoor or outdoor use-resin molded articles; woodwork products including staircase, floor, furniture and the like; and aluminum foil and door mirrors underwent treatments such as plating, vapor deposition and sputtering, and a coating material using the same and a coating film thereof.

BACKGROUND ART

Resin molded articles such as polycarbonate or acrylic board hitherto lack properties including hardness, weather resistance, contamination resistance, solvent resistance and the like, and therefore undergo surface treatments in most instances for covering these properties.

The above surface treatments are exemplified by curable type-coating materials such as a room temperature curable coating material or a two-pack urethane coating material (see Patent Literature 1).

However, a film treated with the above coating materials is easy to get a scratch likely to be conspicuous.

Patent literature 1: Japanese Patent Unexamined Application Publication No. 2004-131601

Also, treatments of specular surface of metal such as plating, vapor deposition and sputtering are employed for designability (see Patent Literature 2).

In the case of carrying out the treatments of specular surface of metal, however, a treated film is easy to get a scratch likely to be conspicuous. In addition to this, though the surface treatments as discussed above is commonly carried out after the treatments of specular surface such as vapor deposition and sputtering, a treated film obtained thereby is easy to get a scratch likely to be conspicuous.

Patent Literature 2: Japanese Patent Unexamined Application Publication No. 2003-293146

Further, in recent years, a top coat for automotive vehicles is being directed to achieve a high durability so as to maintain a coating appearance of new one for a long period of time. Therefore, it is required to have an abrasion resistance so as not to get scratches even by carwash, dust, small stones sprung up, or the like.

Coating materials hitherto known to have the abrasion resistance are exemplified by those of an ultraviolet (UV) cure type, an electron beam energy (EB) cure type, a silica-based hard coating agent type, and a two-pack acrylic urethane-based soft type (see Patent Literature 3).

Patent Literature 3: Japanese Patent Examined Publication No. 6-29362

DISCLOSURE OF INVENTION

Problems to be Solved by Invention

However, the above-mentioned coating materials of the UV cure type, the EB cure type and the silica-based hard coating agent type tend to cause cracks or reduction in adhesion against base material, since they use a hard monomer in order to obtain a high hardness and they increase deformation at the time of hardening contraction in order to thicken the density of cross-linkage.

Meanwhile, the above-mentioned two-pack acrylic urethane-based soft type coating material does not cause chipping and cracks; however, has the disadvantages where a tackiness feeling usually remains and where it is inferior in weather resistance and contamination resistance.

The present invention is made in view the above problems of conventional techniques, and an object thereof is to provide a material for a room temperature curable solvent-borne overcoating material having excellent abrasion resistance and chipping resistance and capable of forming a coating film resistant to cracks and the like, a coating material using the same and a coating film thereof.

Means for Solving Problems

As a result of eager studies in order to attain the above object, the prevent inventors have reached the present invention upon finding to attain the above object by using a lipophilic polyrotaxane whose linear molecule and cyclic molecule are hydrophobic.

More specifically, a material for a room temperature curable solvent-borne overcoating material, according to the present invention is characterized by comprising at least one of a lipophilic polyrotaxane alone and a combination of the lipophilic polyrotaxane and other polymers. The lipophilic polyrotaxane includes a cyclic molecule, a linear molecule piercing through the cyclic molecule to include it, and blocking groups disposed at both end terminals of the linear molecule to prevent departure of the cyclic molecule, in which at least one of the linear molecule and the cyclic molecule exhibits hydrophobicity. The other polymers are exemplified by acrylic resin, epoxy resin, polyester resin and the like; however, they are not limited to these.

Additionally, a room temperature curable solvent-borne overcoating material, according to the present invention is characterized by containing the material for the coating material according to the present invention in an amount preferably ranging from 1 to 100%, more preferably ranging from 30 to 100%, much more preferably ranging from 60 to 100%, relative to a film-forming component, preferably in the mass ratio.

Further, an overcoating film according to the present invention is characterized by being formed by curing the room temperature curable solvent-borne overcoating material according to the present invention.

Furthermore, a laminated coating film according to the present invention is characterized by being obtained: by forming a base coat film and a clear coat film using the material for the room temperature curable solvent-borne overcoating material, in sequence on an article to be coated; by forming a clear coat film and a base coat film using the material for the room temperature curable solvent-borne overcoating material, in sequence on an article to be coated; or by forming an enamel coat film using the material for the room temperature curable solvent-borne overcoating material, on an article to be coated.

Effects of Invention

According to the present invention, a lipophilic polyrotaxane whose linear molecule and cyclic molecule are hydrophobic is used. Therefore, the abrasion resistance and the chipping resistance are excellently obtained while being equal to conventional room temperature curable-lacquers in other performances that coating materials should have, such as adhesion and the like.

BEST MODE FOR CARRYING OUT INVENTION

Hereinafter, a material for a room temperature curable solvent-borne overcoating material, a coating material using the same and a coating film thereof will be discussed in detail. In this specification, "%" represents % by mass unless otherwise specified.

As discussed above, the material for the room temperature curable solvent-borne overcoating material of the present invention is formed of a lipophilic polyrotaxane alone or formed of the polyrotaxane and other polymers, the polyrotaxane being modified to be of a room temperature curable type which is soluble in a solvent.

Additionally, the room temperature curable solvent-borne overcoating material of the present invention contains the above-mentioned material or the lipophilic polyrotaxane.

FIG. 1 is a schematic illustration which conceptually shows a modified hydrophobic polyrotaxane.

In the same figure, this modified hydrophobic polyrotaxane 1 includes linear molecule 2, cyclodextrin 3 serving as acyclic molecule, and blocking groups 4 disposed at both end terminals of linear molecule 2, wherein linear molecule 2 pierces through an opening section of cyclic molecule 3 to include cyclic molecule 3. Cyclic molecule 3 is freely movable along liner molecule 2 when an external stress is imposed thereon (by a pulley effect), which gives polyrotaxane excellent elasticity and viscoelasticity. Additionally, cyclodextrin 3 has a hydrophobic modification group 3a.

In the present invention, one of or both of cyclic molecule 3 and linear molecule 2 are hydrophobic, and the lipophilic polyrotaxane exhibits a lipophilicity as a whole. In the lipophilic polyrotaxane that is typically used, cyclic molecule 3 has hydroxyl groups a part of which or all of which are modified with a hydrophobic modification group. The polyrotaxane is therefore soluble in solvents as will be discussed below, and can be blended into solvent-borne coating materials as one component.

By the way, the material for overcoating material, formed of such a lipophilic polyrotaxane according to the present invention, is mixed with other polymers, so as to form a pseudo cross-linking by van der Waals force. It is supposed that both behave as a composition or compound thereof. In this case, the polyrotaxane is supposed to exhibit at least the pulley effect.

In the present invention, a modification group exhibiting hydrophobicity has a hydrophobic group or the hydrophobic group and a hydrophilic group. It is essential only that the modification group as a whole is hydrophobic.

Examples of the hydrophobic group are alkyl group, benzyl group, benzene derivative-containing group, acyl group, silyl group, trityl group, tosyl group, and groups bonded through a urethane bond, ester bond or ether bond; however, the examples are not limited to these.

Examples of the hydrophilic group are alkyl group, carboxyl group, sulfonic acid group, sulfuric ester group, phosphoric ester group, primary to tertiary amino groups, quaternary ammonium salt group and hydroxyalkyl group; however, the examples are not limited to these.

The cyclic molecule included in the lipophilic polyrotaxane is not particularly limited as far as it is included by the linear molecule as discussed above to exert the pulley effect, and therefore is exemplified by various cyclic substances. Incidentally, the cyclic molecule usually has hydroxyl group.

Further, it is essential only that the cyclic molecule is substantially cyclic, and therefore the cyclic molecule may be those which are not completely closed, such as those C-shaped.

Further, the cyclic molecule preferably has reactive group, with which the cyclic molecule can be readily bonded to the above-mentioned hydrophobic modification group.

Examples of the reactive group are hydroxyl group, carboxyl group, amino group, epoxy group, isocyanate group, thiol group and aldehyde group; however, the examples are not limited to these.

Further, it is preferable that the reactive group is a group which does not react with blocking groups as will be discussed below when the blocking groups are formed (blocking reaction).

Additionally, in the lipophilic polyrotaxane used in the present invention, the modification degree of the cyclic molecule with the hydrophobic modification group is preferably not less than 0.02, more preferably not less than 0.04 and furthermore preferably not less than 0.06 on the assumption that the maximum number of modifiable hydroxyl groups that the cyclic molecule has is 1.

In other words, if the modification degree is less than 0.02, the solubility to solvent is insufficient so that insoluble seed is sometimes produced.

Incidentally, the maximum number of the modifiable hydroxyl groups of the cyclic molecule means the number of all hydroxyl groups that the cyclic molecule has before the modification. Further, the modification degree is, in other words, a ratio of the number of the modified hydroxyl groups to the number of all hydroxyl groups.

In a case where the polyrotaxane has many cyclic molecules, it is unnecessary that each of all or a part of hydroxyl groups is modified with the hydrophobic modification group. In other words, there can exist partially a cyclic molecule having hydroxyl group not modified with the hydrophobic modification group, as far as the polyrotaxane exhibit lipophilicity.

As a method of introducing the hydrophobic modification group as discussed above, the following method can be employed.

For example, cyclodextrin is used as the cyclic molecule of polyrotaxane, and an isocyanated PEG-monostearate formed of hexamethylene diisocyanate and PEG-monostearate is reacted with hydroxyl group of the cyclodextrin. By changing an added amount of isocyanated PEG-monostearate, the modification ratio can be arbitrarily regulated.

In the lipophilic polyrotaxane, the number (inclusion amount) of the cyclic molecules included by the linear molecule is preferably within a range of 0.06 to 0.61, more preferably within a range of from 0.11 to 0.48, and furthermore preferably within a range of from 0.24 to 0.41 on the assumption that the maximum inclusion amount to which the linear molecule can include the cyclic molecule is 1.

More specifically, if this ratio is less than 0.06, the pulley effect may be insufficient so as to lower an elongation degree of the coating film. If the inclusion amount exceeds 0.61, the cyclic molecule is placed too close so that the movability of the cyclic molecule may be lowered. Additionally, the elongation degree of the coating film tends to be insufficient as same as the above, thereby degrading the abrasion resistance.

The inclusion amount of the cyclic molecule can be regulated as follows.

For example, BOP reagent (benzotriazole-1-yl-oxy-tris (dimethylamino)phosphonium hexafluorophosphate), HOBt, adamantane amine, diisopropylethyl amine are added to DMF (dimethylformamide) in this order, thereby obtaining a solution. On the other hand, an inclusion complex in which the linear molecule pierces through the cyclic molecule is dispersed in a mixture solvent of DMF/DMSO (dimethyl sulfoxide), thereby obtaining a solution. By changing the mixture ratio of DMF/DMSO upon mixing both, the inclusion amount of the cyclic molecule can be arbitrarily regulated. Incidentally, the higher a ratio of DMF in DMF/DMFO, the higher the inclusion amount of the cyclic molecule.

Concrete examples of the cyclic molecule are various cyclodextrins such as α-cyclodextrin (the number of glucose: 6), β-cyclodextrin (the number of glucose: 7), γ-cyclodextrin (the number of glucose: 8), dimethylcyclodextrin, glucocylcyclodextrin, and derivatives or modified compounds of these, as well as crown ethers, benzo crowns, dibenzo crowns, dicyclohexano crowns, and derivatives or modified compounds of these.

One kind of the above-mentioned cyclic molecules such as cyclodextrin can be singly used, or not less than two kinds of them are used in combination.

Of the above-mentioned various cyclic molecules, α-cyclodextrin, β-cyclodextrin and γ-cyclodextrin are particularly preferable, in which α-cyclodextrin is preferable from the viewpoint of the characteristics of being included.

On the other hand, the linear molecule may substantially have a straight chain and may have a branched chain as far as the cyclic molecule serving as the rotator is rotatably included to be able to exhibit the pulley effect.

Additionally, the length of the linear molecule is not limited to a particular one as far as the cyclic molecule can exhibit the pulley effect, though it is influenced by the magnitude of the cyclic molecule.

The linear molecule preferably has reactive groups at its both end terminals, by which the linear molecule can be readily reacted with the above-mentioned blocking groups.

Such reactive group may be suitably changed in accordance with kinds of the blocking group to be used, and exemplified by hydroxyl group, amino group, carboxyl group and thiol group.

Such a linear molecule is not limited to a particular one, and exemplified by: polyesters such as polyalkylenes and polycaprolacton; polyethers such as polyethylene glycol; polyamids; polyacrylic acids; and linear molecules having benzene ring.

Of these linear molecules, polyethylene glycol and polycaprolacton are particularly preferable, in which polyethylene glycol is preferable from the viewpoint of solubility in water or a solvent.

The molecular weight of the linear molecule is preferably within a range of from 1,000 to 70,000, more preferably within a range of from 10,000 to 50,000, furthermore preferably within a range of from 35,000 to 50,000.

If the molecular weight of the linear molecule is less than 1,000, the pulley effect by the cyclic molecule is not obtained sufficiently so as to lower the elongation degree of the coating film, thereby lowering the abrasion resistance. If the molecular weight exceeds 70,000, a coating property in use of the coating material thereof is lowered, and the overcoating film tends to be lowered in evenness and appearance such as luster.

On the other hand, the blocking group may be any group as far as it is a group disposed at both end terminals of the above-mentioned linear molecule to be able to maintain a condition where the linear molecule pierces through the cyclic molecule.

Such a group is exemplified by a group having a "bulkiness" or a group having an "ionic character". Here, "group" means a variety of groups including a molecule group and a polymer group.

Examples of the group having the "bulkiness" are a spherical one and a side wall-shaped one.

Additionally, the ionic character of the group having the "ionic character" and the ionic character of the cyclic molecule are mutually affected, for example, repel each other, so as to maintain a condition where the linear molecule pierces through the cyclic molecule.

Concrete examples of the blocking group are: dinitrophenyl groups such as 2,4-dinitrophenyl group and 3,5-dinitrophenyl group; cyclodextrins; adamantine groups; trityl groups; fluoresceins; pyrenes; and derivatives or modified compounds of these.

Next, a production method of the lipophilic polyrotaxane used in the present invention will be discussed.

As discussed above, the lipophilic polyrotaxane can be obtained by making a process including:

(1) a step of mixing a cyclic molecule and a linear molecule so that the linear molecule includes the cyclic molecule in such a manner that the linear molecule pieces through the opening section of the cyclic molecule;

(2) a step of blocking the both end terminals (the both end terminals of the linear molecule) of the obtained pseudo-polyrotaxane with blocking groups so as to adjust to prevent departure of the cyclic molecule from a piercing condition; and (3) a step of modifying hydroxyl group of the cyclic molecule of the obtained polyrotaxane with hydrophobic modification group.

The lipophilic polyrotaxane can be obtained also by using a cyclic molecule whose hydroxyl groups has been previously modified with hydrophobic modification groups, at the above step (1). In this case, the above step (3) can be omitted.

By the above production method, the lipophilic polyrotaxane excellent in solubility in various solvents can be obtained.

Such a solvent is not limited to a particular one, and exemplified by: alcohols such as isopropyl alcohol and butyl alcohol; esters such as ethyl acetate and butyl acetate; ketones such as methyl ethyl ketone and methyl isobutyl ketone; ethers such as diethyl ether and dioxane; hydrocarbon solvents such as toluene and xylene. The lipophilic polyrotaxane exhibits a good solubility also in a solvent prepared by mixing not less than two kinds of these.

In the present invention, the lipophilic polyrotaxane may be one forming pseudo cross-linking or cross-linking as far as soluble in an organic solvent. Additionally, the lipophilic polyrotaxane may be used instead of one that does not form cross-linking or used by being mixed therewith.

Such a cross-linked lipophilic polyrotaxane is exemplified by a lipophilic polyrotaxane cross-linked with a polymer having a relatively low molecular weight, typically with polymer having a molecular weight of about several thousands.

The room temperature curable solvent-borne overcoating material according to the present invention contains the above material for room temperature curable solvent-borne overcoating material, or the above-mentioned lipophilic polyrotaxane. The content thereof is preferably within a range of from 1 to 100%, more preferably within a range of from 30 to 100%, and furthermore preferably within a range of from 60 to 100%, by mass relative to a film-forming component (such as polymer, a curing agent and the like).

In a case where the content of the lipophilic polyrotaxane relative to the film-forming component is less than 1%, the pulley effect of polyrotaxane cannot be obtained sufficiently thereby lowering the elongation degree of coating film, so that a desired abrasion resistance may be not obtained.

The room temperature curable solvent-borne overcoating material according to the present invention is obtained by being blended into, for example, acrylic lacquer, cellulose-based lacquer or urethane resin coating material, preferably in such a manner as to be the above-mentioned content.

In other words, a resinous component, an additive, a pigment, a glittering agent or solvent, and any combination of these are prepared based on the normal method, and mixed with the room temperature curable solvent-borne overcoating material according to the present invention or with the lipophilic polyrotaxane.

Though the resinous component is not limited to a particular one, it is preferably those having at its main chain or at its side chain hydroxyl group, amino group, carboxyl group, epoxy group, vinyl group, thiol group, photocross-linking group or a group relating to any combination of these.

Examples of the photocross-linking group are cinnamic acid, coumarin, chalcone, anthracene, styrylpyridine, styrylpyridinium salt and styrylquinoline salt.

Additionally, not less than two kinds of the resinous components may be used. In this case, it is required that at least one kind resinous component is combined with polyrotaxane through the cyclic molecule.

Further, such a resinous component may be a homopolymer or a copolymer. In case of the copolymer, the copolymer may be constituted of not less than two kinds of the monomers, and may be any of a block copolymer, an alternating copolymer, a random copolymer and a graft copolymer.

Concrete examples of such a resinous component are polyvinyl alcohol, polyvinyl pyrrolidone, poly(meth)acrylic acid, cellulose-based resin such as carboxylmethyl cellulose, hydroxyethyl cellulose, hydroxypropyl cellulose and the like, polyacryl amide, polyethylene oxide, polyethylene glycol, polypropylene glycol, polyvinyl acetal-based resin, polyvinylmethyl ether, polyamine, polyethylene imine, casein, gelatin, starch, and a copolymer of these, polyolefin-based resin such as polyethylene, polypropylene, and a copolymer resin of these with other olefin-based monomers, polyester resin, polyvinyl chloride resin, polystyrene-based resin such as polystyrene, acrylonitrile-styrene copolymer resin or the like, acrylic resin such as polymethylmethacrylate, (meth) acrylate ester copolymer, acrylonitrile-methyl acrylate copolymer or the like, polycarbonate resin, polyurethane resin, vinyl chloride-vinyl acetate copolymer resin, polyvinyl butyral resin and a derivative or a modified compound of these, polyisobutylene, poytetrahydrofuran, polyaniline, acrylonitrile-butadiene-styrene copolymer (ABS resin), polyamides such as Nylon (registered trade mark) and the like, polyimides, polydienes such as polyisoprene, polybutadiene and the like, polysiloxanes such as polydimethyl siloxane and the like, polysulfones, polyimines, polyacetic anhydrides, polyureas, polysulfides, polyphosphazenes, polyketones, polyphenylenes, polyhaloolefins, and derivatives of these.

The devivatives preferably have hydroxyl group, amino group, carboxyl group, epoxy group, vinyl group, thiol group or the photocross-linking group, or a group relating to a combination of these.

Concrete examples of the additive are a dispersant, a ultraviolet absorber, a photostabilizer, a surface conditioner and a foaming preventing agent.

Concrete examples of the pigment are: organic coloring pigments such as an azo-based pigment, a phthalocyanine-based pigment or a perylene-based pigment; and inorganic coloring pigments such as carbon black, titanium dioxide or colcothar.

Concrete examples of the glittering agent are an aluminum pigment and a mica pigment.

Concrete examples of the solvent are: esters such as ethyl acetate, butyl acetate or isobutyl acetate; ketones such as methyl ethyl ketone or methyl isobutyl ketone; ethers such as diethyl ether or dioxane; hydrocarbon solvents such as toluene, xylene or solvesso; and alcohols having a highly hydrophobic long chain. Not less than two kinds of these may be used in combination. Additionally, it is essential only that the solvent is regarded as an organic solvent as a whole, even if water or a water-based solvent such as butylcellosolve acetate is slightly contained therein.

Further, the above-mentioned overcoating material can form a clear coat film, a base coat film or an enamel coat film, as a common clear coating material, a base coat material or an enamel coat material.

More specifically, the overcoating material may be prepared to be an acrylic coating material, a melamine-based coating material, a urethane-based coating material, a polyester-based coating material or the like.

Furthermore, these may be of a one-pack type, a two-pack type (such as urethane resin coating material) or the like.

The clear coat film preferably has a film thickness of from about 20 to 40 μm. The base coat film preferably has a film thickness of from about 10 to 15 μm. The enamel coat film preferably has a film thickness of from about 20 to 40 μm. However, these are not particularly limited.

The room temperature curable solvent-borne overcoating material according to the present invention can be coated by various coating device represented by a spray gun, with a workability equal to that in conventional coating materials, on various articles to be coated, the articles being formed of: metallic materials such as iron, steel or aluminum; resinous materials; wood materials; lithic materials such as stone, brick or block; or leather materials. The room temperature curable solvent-borne overcoating material is dried or solidified at a room temperature, thereby forming the overcoating film. A thickness of the overcoating film is not limited to a particular one, the overcoating material is coated preferably to have a thickness of from 10 to 40 μm.

Then, a laminated coat film of the present invention will be discussed in detail.

The laminated coat film of the present invention is formed such that an article to be coated is coated with an undercoating film, a base coat film, and the clear coat film using the solvent-borne overcoating material, in order.

This improves the laminated coat film in scratch resistance and in chipping resistance.

Typical examples of the article are: various metallic materials such as iron, aluminum or copper; various organic materials such as polypropylene and polycarbonate; various inorganic materials such as quarts and ceramics (for example, calcium carbide)

As a method for coating the solvent-borne overcoating material on these, the known or common method can be employed. It is exemplified by the brushing method, the spraying method, the electrostatic painting method, the electropainting method, the powder coating method, and the sputtering method.

The solvent-borne overcoating material forms a coating film by a room temperature curing treatment, in which the coating film may be formed by a heat curing treatment.

The solvent-borne overcoating material may be coated on a part of or a whole of the article to be coated. In general, the base coat film includes the clear layer while the enamel coat film does not include the clear layer. Additionally, in the laminated coat film of the present invention a further undercoating film is formed between the article to be coated and the base coat film. In this case, the chipping resistance thereof can be further improved. Moreover, the base coat film is further improved in evenness, thereby forming the clear coat film evenly. Additionally, adhesion of an interface is further improved.

On the other hand, another embodiment of laminated coat film according to the present invention is formed such that the enamel coat film using the solvent-borne overcoating material is formed on the article to be coated.

With this, the laminated coat film is improved in scratch resistance and in chipping resistance. In addition to this, the laminated coat film is improved in surface evenness.

Additionally, it is preferable to further form the undercoating film between the article to be coated and the enamel coat film. In this case, the laminated coat film is further improved in scratch resistance and in chipping resistance.

An example (a schematic cross-sectional view) of the laminated coat film of the present invention is shown in FIGS. 2 and 3.

A laminated coat film as shown in FIG. 2 includes undercoating film layer 10, base coat film 11, and a clear coat film 12 formed thereon and serving as the room temperature curable solvent-borne overcoating material of the present invention. Moreover, a laminated coat film as shown in FIG. 3 is formed such that undercoating film layer 10 and enamel coat film 11 serving as the room temperature curable solvent-borne overcoating material of the present invention are formed in order.

"Laminated coat film" includes a coating film formed such that the article to be coated is coated with the solvent-borne overcoating material alone, for ease of description; however, this coating film is not limited to a single layer and therefore may be formed including a plurality of layers.

EXAMPLE

Hereafter, the present invention will be further discussed with reference to some examples; however, the present invention is not limited to these examples.

Example 1

(1) Preparation of PEG-Carboxylic Acid by TEMPO oxidation of PEG 10 g of polyethylene glycol (PEG) (molecular weight: 1000), 100 mg of TEMPO (2,2,6,6-tetramethyl-1-piperidinyl-oxy radical) and 1 g of sodium bromide were dissolved in 100 mL of water. An aqueous solution of commercially available sodium hypochlorite (available chlorine concentration: 5%) in an amount of 5 mL was added thereto, and stirred at room temperature for 10 minutes. In order to decompose excessive sodium hypochlorite, ethanol was added to an extent of 5 mL in maximum, and then the reaction was terminated.

An extraction using 50 mL of methylene chloride was repeated three times thereby to extract components other than inorganic salts. Thereafter, methylene chloride was distilled out from the extracted components by an evaporator. Then, the components were dissolved in 250 mL of warm ethanol and then allowed to stand in a freezer ($-4°$ C.) overnight thereby extracting PEG-carboxylic acid alone, followed by recovering and drying.

(2) Preparation of Inclusion Complex by Using PEG-Carboxylic Acid and $\alpha$-CD The above-mentioned prepared PEG-carboxylic acid in an amount of 3 g and $\alpha$-cyclodextrin ($\alpha$-CD) in an amount of 12 g were respectively dissolved in 50 mL of warm water of 70° C. which were respectively prepared, upon which they were mixed and well stirred, followed by being allowed to stand in a refrigerator (4° C.) overnight. Then, an inclusion complex precipitated in the form of cream was lyophilized and recovered.

(3) Amount Reduction of $\alpha$-CD and Blocking of the Inclusion Complex by Using Adamantane Amine and Bop Reagent Reaction System 14 g of the inclusion complex prepared as above was dispersed in 20 mL of a mixture solvent of dimethylformamide/dimethyl sulfoxide (DMF/DMSO) (75/25 in volume ratio).

On the other hand, 3 g of benzotriazole-1-yl-oxy-tris(dimethylamino)phosphonium hexafluorophosphate (BOP reagent), 1 g of 1-hydroxybenzotriazole (HOBt), 1.4 g of adamantane amine and 1.25 mL of diisopropylethyl amine were dissolved in 10 mL of DMF in this order, at room temperature. This solution was added to the above-mentioned prepared dispersion solution and smoothly shaken to be mixed.

A sample in a slurry state was allowed to stand in a refrigerator (4° C.) overnight. Upon being allowed to stand overnight, 50 mL of a mixture solvent of DMF/methanol was added thereto, and then mixed and centrifuged, followed by discarding a supernatant. Washing with the above-mentioned mixture solvent of DMF/methanol was repeated two times, and further washing with 100 mL of methanol was repeated two times under a similar centrifugation.

An obtained precipitate was dried under a vacuum-drying, and thereafter it was dissolved in 50 mL of DMSO, upon which an obtained transparent solution was dropped into 700 mL of water thereby precipitating polyrotaxane. The precipitated polyrotaxane was recovered by a centrifugation, and then vacuum-dried or lyophilized.

A cycle including dissolving in DMSO, precipitation in water, recovery and drying was repeated two times, thereby finally obtaining purified polyrotaxane.

(4) Hydroxylpropylation of Hydroxyl Groups of Cyclodextrin

The above-mentioned prepared polyrotaxane in an amount of 500 mg was dissolved in 50 mL of 1 mol/L aqueous solution of NaOH, followed by addition of 3.83 g (66 mmol) of propylene oxide. Then, it was stirred overnight in an atmosphere of argon at room temperature. Then, it was neutralized with 1 mol/L aqueous solution of HCl, and dialyzed by a dialysis tube. Thereafter, it was lyophilized and recovered thereby obtaining a modified hydrophilic polyrotaxane of this Example. The obtained modified hydrophilic polyrotaxane was identified with $^1$H-NMR and GPC thereby confirming that it was a desired polyrotaxane. Here, the inclusion amount of $\alpha$-CD was 0.06, and the modification degree with hydrophilic modification groups was 0.1.

(5) Modification of Hydrophobic Groups of Polyrotaxane 10 mL of $\epsilon$-caprolactone dried by a molecular sieve was added to 500 mg of the above-mentioned prepared hydroxypropylated polyrotaxane, and then stirred for 30 minutes so as to penetrate. Then, 0.2 mL of tin 2-ethylhexoate was added thereto and reacted for 1 hour at a temperature of 100° C.

After the reaction was terminated, the sample was dissolved in 50 mL of toluene. Thereafter, it was dropped into 450 mL of stirred hexane to make precipitation, followed by recovering and drying, thereby obtaining a modified hydrophobic polyrotaxane of this Example. The obtained modified hydrophobic polyrotaxane was identified with $^1$H-NMR and GPC thereby confirming that it was a desired polyrotaxane. Here, the inclusion amount of α-CD was 0.06, and the modification degree with hydrophobic modification groups was 0.02.

(6) Preparation of Clear Coat Material

An obtained polyrotaxane was dissolved in toluene to an amount of 10%.

Then, a resinous solution was obtained in such a manner as to dissolve cellulose acetate butylate (available from EASTMAN CHEMICAL under the trade name of CAB-381-0.5) in toluene to an amount of 20%. The above-mentioned polyrotaxane-toluene solution was added to the resinous solution to be in an amount of 50% relative to a film-forming component while being stirred, thereby obtaining a clear coat material.

(7) Formation of Laminated Coat Film

A cationic electrodeposition coating material (a cationic electrodeposition coating material available from NIPPON PAINT CO., LTD. under the trade name of "POWERTOP U600M") was electrodeposition-coated on a zinc phosphate-treated dull steel plate 150 mm long by 70 mm wide by 0.8 mm thick. Then, the plate was baked at 160° C. for 30 minutes, so as to form a coating film having a thickness of 20 μm in a dried state.

Thereafter, a gray undercoating (available from NOF Corporation under the trade name of "Hi-Epico No. 500") was coated thereon so as to have a thickness of 30 μm, and then baked at 140° C. for 30 minutes.

Then, "Bell Coat No. 6010" available from NOF Corporation and having a metallic color was coated thereon to have a thickness of 15 μm, and thereafter baked at 140° C. for 30 minutes. Further, a clear coat material containing polyrotaxane was coated thereon to have a thickness of 30 μm.

Example 9

(1) Preparation of PEG-carboxylic acid by TEMPO oxidation of PEG 10 g of polyethylene glycol (PEG) (molecular weight: 35000), 100 mg of TEMPO (2,2,6,6-tetramethyl-1-piperidinyl-oxy radical) and 1 g of sodium bromide were dissolved in 100 mL of water. An aqueous solution of commercially available sodium hypochlorite (available chlorine concentration: 5%) in an amount of 5 mL was added thereto, and stirred at room temperature for 10 minutes. In order to decompose excessive sodium hypochlorite, ethanol was added to an extent of 5 mL in maximum, and then the reaction was terminated.

An extraction using 50 mL of methylene chloride was repeated three times thereby to extract components other than inorganic salts. Thereafter, methylene chloride was distilled out from the extracted components by an evaporator. Then, the components were dissolved in 250 mL of warm ethanol and then allowed to stand in a freezer (−4° C.) overnight thereby extracting PEG-carboxylic acid alone, followed by recovering and drying it.

(2) Preparation of Inclusion Complex by Using PEG-Carboxylic Acid and α-CD

The above-mentioned prepared PEG-carboxylic acid in an amount of 3 g and α-cyclodextrin (α-CD) in an amount of 12 g were respectively dissolved in 50 mL of warm water of 70° C. which were respectively prepared, upon which they were mixed and well stirred, followed by being allowed to stand in a refrigerator (4° C.) overnight. Then, an inclusion complex precipitated in the form of cream was lyophilized and recovered.

(3) Blocking of the Inclusion Complex by Using Adamantane Amine and BOP Reagent Reaction System 3 g of BOP reagent, 1 g of HOBt, 1.4 g of adamantane amine and 1.25 mL of diisopropylethyl amine were dissolved in 10 mL of DMF in this order, at room temperature. 14 g of the above-mentioned prepared inclusion complex was added thereto, and smoothly shaken to be mixed.

A sample in a slurry state was allowed to stand in a refrigerator (4° C.) overnight. Upon being allowed to stand overnight, 50 mL of a mixture solvent of DMF/methanol was added thereto, and then mixed and centrifuged, followed by discarding a supernatant. Washing with the above-mentioned mixture solvent of DMF/methanol was repeated two times, and further washing with 100 mL of methanol was repeated two times under a similar centrifugation.

An obtained precipitate was dried under a vacuum-drying, and thereafter it was dissolved in 50 mL of DMSO, upon which an obtained transparent solution was dropped into 700 mL of water thereby precipitating polyrotaxane. The precipitated polyrotaxane was recovered by a centrifugation, and then vacuum-dried or lyophilized.

A cycle including dissolving in DMSO, precipitation in water, recovery and drying was repeated two times, thereby finally obtaining purified polyrotaxane.

(4) Hydroxylpropylation of Hydroxyl Groups of Cyclodextrin

The above-mentioned prepared polyrotaxane in an amount of 500 mg was dissolved in 50 mL of 1 mol/L aqueous solution of NaOH, followed by addition of 3.83 g (66 mmol) of propylene oxide. Then, it was stirred overnight in an atmosphere of argon at room temperature. Then, it was neutralized with 1 mol/L aqueous solution of HCl, and dialyzed by a dialysis tube. Thereafter, it was lyophilized and recovered.

(5) Modification of Hydrophobic Groups of Polyrotaxane 10 mL of ε-caprolactone dried by a molecular sieve was added to 500 mg of the above-mentioned prepared hydroxypropylated polyrotaxane, and then stirred for 30 minutes so as to penetrate. Then, 0.2 mL of tin 2-ethylhexoate was added thereto and reacted for 1 hour at a temperature of 100° C.

After the reaction was terminated, the sample was dissolved in 50 mL of toluene. Thereafter, it was dropped into 450 mL of stirred hexane to make precipitation, followed by recovering and drying it, thereby obtaining a modified hydrophobic polyrotaxane of this Example.

The obtained modified hydrophobic polyrotaxane was identified with $^1$H-NMR and GPC thereby confirming that it was a desired polyrotaxane. Here, the inclusion amount of α-CD was 0.61, and the modification degree with hydrophobic modification groups was 0.02.

(6) Preparation of Colored Overcoating Material (Enamel)

An obtained polyrotaxane was dissolved in toluene to an amount of 10%.

Then, a resinous solution was obtained in such a manner as to dissolve cellulose acetate butylate (available from EASTMAN CHEMICAL under the trade name of CAB-381-0.5) in toluene to an amount of 20%. The polyrotaxane-toluene solution was added to the resinous solution to an amount of 1% relative to a film-forming component while being stirred, followed by dispersion of a pigment, thereby obtaining an enamel coat material.

(7) Formation of Laminated Coat Film

A cationic electrodeposition coating material (a cationic electrodeposition coating material available from NIPPON PAINT CO., LTD. under the trade name of "POWERTOP U600M") was electrodeposition-coated on a zinc phosphate-treated dull steel plate 150 mm long by 70 mm wide by 0.8 mm thick. Then, the plate was baked at 160° C. for 30 minutes, so as to form a coating film having a thickness of 20 μm in a dried state.

Thereafter, a gray undercoating (available from NOF Corporation under the trade name of "Hi-Epico No. 500") was coated thereon so as to have a thickness of 30 μm, and then baked at 140° C. for 30 minutes. Further, an enamel coat material containing polyrotaxane was coated thereon, so as to have a thickness of 30 μm.

Comparative Example 6

(1) Preparation of PEG-Carboxylic Acid by TEMPO Oxidation of PEG 10 g of polyethylene glycol (PEG) (molecular weight: 100,000), 100 mg of TEMPO (2,2,6,6-tetramethyl-1-piperidinyl-oxy radical) and 1 g of sodium bromide were dissolved in 100 mL of water. An aqueous solution of commercially available sodium hypochlorite (available chlorine concentration: 5%) in an amount of 5 mL was added thereto, and stirred at room temperature for 10 minutes. In order to decompose excessive sodium hypochlorite, ethanol was added to an extent of 5 mL in maximum, and then the reaction was terminated.

An extraction using 50 mL of methylene chloride was repeated three times thereby to extract components other than inorganic salts. Thereafter, methylene chloride was distilled out from the extracted components by an evaporator. Then, the components were dissolved in 250 mL of warm ethanol and then allowed to stand in a freezer (−4° C.) overnight thereby extracting PEG-carboxylic acid alone, followed by recovering and drying it.

(2) Preparation of Inclusion Complex by Using PEG-Carboxylic Acid and α-CD

The above-mentioned prepared PEG-carboxylic acid in an amount of 3 g and α-cyclodextrin (α-CD) in an amount of 12 g were respectively dissolved in 50 mL of warm water of 70° C. which were respectively prepared, upon which they were mixed and well stirred, followed by being allowed to stand in a refrigerator (4° C.) overnight. Then, an inclusion complex precipitated in the form of cream was lyophilized and recovered.

(3) Blocking of the Inclusion Complex by Using Adamantane Amine and BOP Reagent Reaction System 3 g of benzotriazole-1-yl-oxy-tris(dimethylamino)phosphonium hexafluorophosphate (BOP reagent), 1 g of 1-hydroxybenzotriazole (HOBt), 1.4 g of adamantane amine and 1.25 mL of diisopropylethyl amine were dissolved in 10 mL of DMF in this order, at room temperature. 14 g of the prepared inclusion complex was added thereto and then it was smoothly and sufficiently shaken.

A sample in a slurry state was allowed to stand in a refrigerator (4° C.) overnight. Upon being allowed to stand overnight, 50 mL of a mixture solvent of DMF/methanol (1:1 in volume ratio) was added thereto, and then mixed and centrifuged, followed by discarding a supernatant. Washing with the above-mentioned mixture solvent of DMF/methanol was repeated two times, and further washing with 100 mL of methanol was repeated two times under a similar centrifugation.

An obtained precipitate was dried under a vacuum-drying, and thereafter it was dissolved in 50 mL of DMSO, upon which an obtained transparent solution was dropped into 700 mL of water thereby precipitating polyrotaxane. The precipitated polyrotaxane was recovered by a centrifugation, and then vacuum-dried or lyophilized.

A cycle including dissolving in DMSO, precipitation in water, recovery and drying was repeated two times, thereby finally obtaining purified polyrotaxane.

(4) Hydroxylpropylation of Hydroxyl Groups of Cyclodextrin

The above-mentioned prepared polyrotaxane in an amount of 500 mg was dissolved in 50 mL of 1 mol/L aqueous solution of NaOH, followed by addition of 3.83 g (66 mmol) of propylene oxide. Then, it was stirred overnight in an atmosphere of argon at room temperature. Then, it was neutralized with 1 mol/L aqueous solution of HCl, and dialyzed by a dialysis tube. Thereafter, it was lyophilized and recovered, thereby obtaining a modified hydrophilic polyrotaxane of this Example.

The obtained modified hydrophilic polyrotaxane was identified with $^1$H-NMR and GPC thereby confirming that it was a desired polyrotaxane. Here, the inclusion amount of α-CD was 0.06, and the modification degree with hydrophilic modification groups was 0.1.

(5) Preparation of Clear Coat Material

An obtained polyrotaxane was dissolved in toluene to an amount of 10%.

Then, a resinous solution was obtained in such a manner as to dissolve cellulose acetate butylate (available from EASTMAN CHEMICAL under the trade name of CAB-381-0.5) in toluene to an amount of 20%. The above-mentioned polyrotaxane-toluene solution was added to the resinous solution to an amount of 50% relative to a film-forming component while being stirred, thereby obtaining a clear coat material.

(6) Formation of Laminated Coat Film

A cationic electrodeposition coating material (a cationic electrodeposition coating material available from NIPPON PAINT CO., LTD under the trade name of "POWERTOP U600M") was electrodeposition-coated on a zinc phosphate-treated dull steel plate 150 mm long by 70 mm wide by 0.8 mm thick. Then, the plate was baked at 160° C. for 30 minutes, so as to form a coating film having a thickness of 20 μm in a dried state.

Thereafter, a gray undercoating (available from NOF Corporation under the trade name of "Hi-Epico No. 500") was coated thereon so as to have a thickness of 30 μm, and then baked at 140° C. for 30 minutes.

Then, "Bell Coat No. 6010" available from NOF Corporation and having a metallic color was coated thereon to have a thickness of 15 μm, and thereafter baked at 140° C. for 30 minutes. Further, a clear coat material containing polyrotaxane was coated thereon to have a thickness of 30 μm.

Examples 2 to 8 and 10 to 14, and Comparative Examples 1 to 5

The procedure of Example 1 was repeated with the exception of specifications as shown in Table 1, thereby forming a laminated coat film.

The following evaluations (1) to (6) were conducted on the obtained coating materials and the laminated coat films.

(1) Solubility

A whiteness of a glass plate coated with the overcoating material obtained in the the step to prepare the coating material was visually evaluated.

A: Not changed
B: Slightly whitened
C: Whitened and separated (2) Evenness

An evenness degree of the overcoating film included in the laminated coat film obtained in the the step to form the laminated coat film was visually evaluated.

A: Highly even
B: Slightly uneven
C: Uneven (3) Abrasion resistance

A dust flannel (or a friction cloth) was attached to a sliding member of an abrasion testing machine with a double-sided adhesive tape, upon which 50 times of reciprocating motions were made under a load of 0.22 g/cm$^2$ on the overcoating film included in the laminated coat film obtained in the the step to form the laminated coat film. Then, the presence or absence of scratches was evaluated.

A: Few scratches
B: Some scratches
C: Many scratches (4) Precipitation of Pigment The overcoating material obtained in the the step to prepare the coating material was set aside in a constant temperature bath of 40□ for 1 month, upon which it was evaluated whether a precipitated substance causes a hard-caking (or a state where the substance was solidified so as not to recover even if stirred).

A: Recovered
B: Recovered with time
C: Not recovered (5) Weather resistance

A test was conducted on the overcoating film included in the laminated coat film obtained in the the step to form the laminated coat film, by a xenon weather meter (XWM) for 1440 hours, and then a color difference ($\Delta E$) was measured.

A: $\Delta E \leq 3$
B: $3 < \Delta E \leq 5$
C: $\Delta E > 5$

TABLE 1

| | | Polyrotaxane | | |
| --- | --- | --- | --- | --- |
| Items | Molecular weight of PEG | Inclusion amount of α-CD | Modification degree with hydrophobic modification groups | Content in coat film (%) |
| Example 1 | 1,000 | 0.06 | 0.02 | 50 |
| Example 2 | 1,000 | 0.61 | 0.02 | 50 |
| Example 3 | 70,000 | 0.06 | 0.02 | 50 |
| Example 4 | 70,000 | 0.61 | 0.02 | 50 |
| Example 5 | 35,000 | 0.61 | 0.02 | 1 |
| Example 6 | 35,000 | 0.61 | 0.02 | 50 |
| Example 7 | 35,000 | 0.61 | 0.5 | 50 |
| Example 8 | 35,000 | 0.61 | 0.02 | 100 |
| Example 9 | 35,000 | 0.61 | 0.02 | 1 |
| Example 10 | 35,000 | 0.61 | 0.02 | 50 |
| Example 11 | 35,000 | 0.61 | 0.5 | 50 |
| Example 12 | 35,000 | 0.61 | 0.02 | 100 |
| Example 13 | 500 | 0.61 | 0.5 | 50 |
| Example 14 | 100,000 | 0.61 | 0.5 | 50 |
| Comparative Example 1 | 35,000 | 0.61 | 0.02 | 0 |
| Comparative Example 2 | 500 | 0.06 | 0 | 50 |
| Comparative Example 3 | 500 | 0.61 | 0 | 50 |
| Comparative Example 4 | 100,000 | 0.06 | 0 | 50 |
| Comparative Example 5 | 100,000 | 0.61 | 0 | 50 |
| Comparative Example 6 | 100,000 | 0.61 | 0.1(Hydrophilic groups) | 50 |

TABLE 1-continued

| Items | Kind of coating material | Solubility to coating material | Precipitation of pigment | Evenness | Abrasion resistance | Weather resistance |
|---|---|---|---|---|---|---|
| Example 1 | Clear coat material | A | — | A | B | A |
| Example 2 | Clear coat material | A | — | A | B | A |
| Example 3 | Clear coat material | A | — | A | A | A |
| Example 4 | Clear coat material | A | — | A | A | A |
| Example 5 | Clear coat material | A | — | A | B | A |
| Example 6 | Clear coat material | A | — | A | A | A |
| Example 7 | Clear coat material | A | — | A | A | A |
| Example 8 | Clear coat material | A | — | A | A | A |
| Example 9 | Enamel coat material | A | A | A | B | A |
| Example 10 | Enamel coat material | A | A | A | A | A |
| Example 11 | Enamel coat material | A | A | A | A | A |
| Example 12 | Enamel coat material | A | A | A | A | A |
| Example 13 | Clear coat material | B | — | A | B | A |
| Example 14 | Clear coat material | B | — | B | B | B |
| Comparative Example 1 | Clear coat material | — | — | A | C | A |
| Comparative Example 2 | Clear coat material | C | — | C | C | A |
| Comparative Example 3 | Clear coat material | C | — | C | C | A |
| Comparative Example 4 | Clear coat material | C | — | C | C | B |
| Comparative Example 5 | Clear coat material | C | — | C | C | B |
| Comparative Example 6 | Clear coat material | C | — | C | C | B |

As apparent from results shown in Table 1, the overcoating film included in each laminated coat film of Examples 1 to 12 (which are preferable Examples of the present invention) is found to exhibit the pulley effect with addition of lipophilic polyrotaxane, and is found to be improved in abrasion resistance. Further, it is found to be excellent in solubility, evenness, precipitation of pigment, and weather resistance.

Additionally, it is found that the abrasion resistance is degraded in a case where the linear molecule has a molecular weight of less than 1,000, as apparent from Example 13. It is further found that the evenness, precipitation of pigment and weather resistance are degraded in a case where the linear molecule has a molecular weight exceeding 70,000, as apparent from Example 14.

On the other hand, it is found from Comparative Examples 1 to 6 that the effect on the abrasion resistance is not obtained when lipophilic polyrotaxane is not added.

As discussed above, according to the present invention, it is allowed to obtain a desired appearance with a workability equal to that in usual coating while improving the overcoating film in abrasion resistance such as scratch resistance or chipping resistance.

Explanation of Reference Numerals

Figure 1:
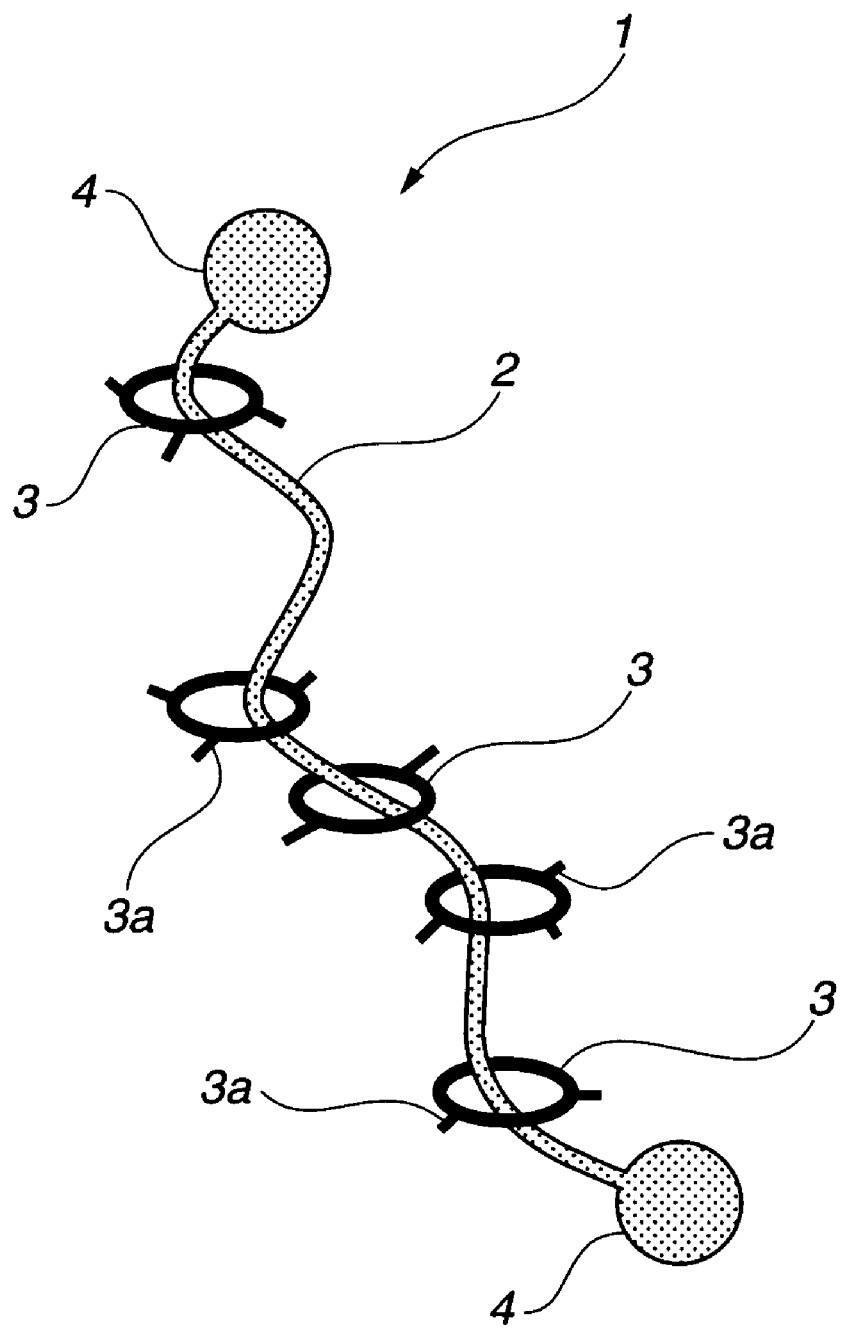
FIG. 1 A schematic illustration conceptually showing a modified hydrophobic polyrotaxane.
Figure 2:
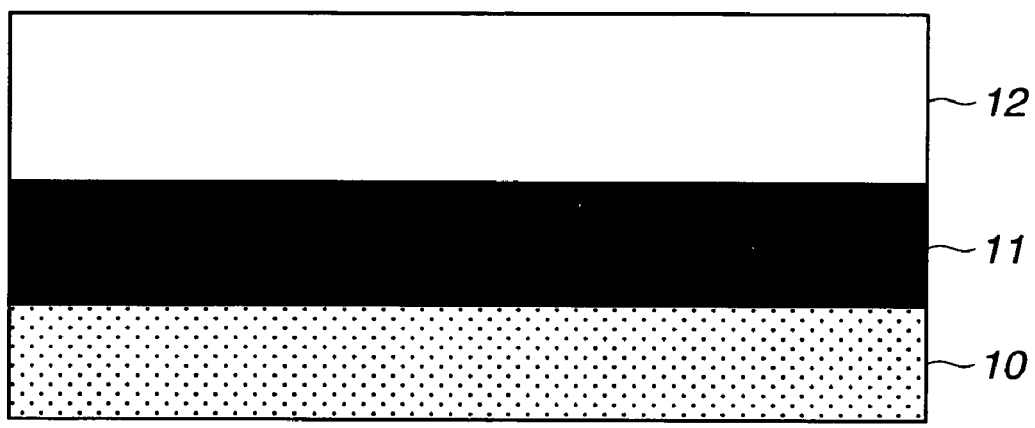
FIG. 2 A schematic cross-sectional view showing an embodiment of a structure of a laminated coat film of the present invention.
Figure 3:
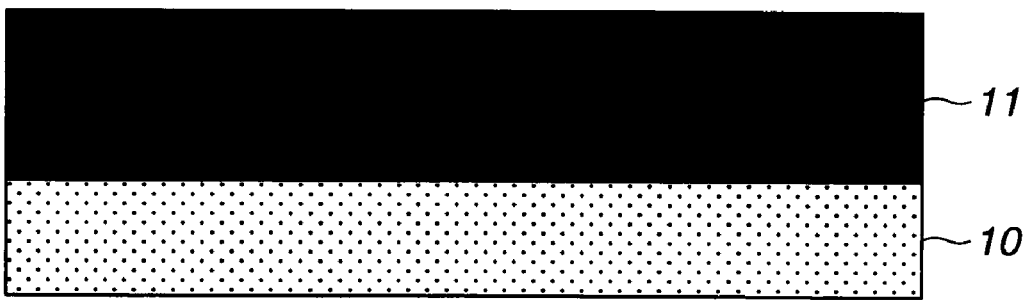
FIG. 3 A schematic cross-sectional view showing another embodiment of a structure of a laminated coat film of the present invention.

1 Modified hydrophobic polyrotaxane
2 Linear molecule
3 Cyclic molecule (Cyclodextrin)
3a Hydrophobic modification group
4 Blocking group
10 Undercoating film
11 Enamel coat (or Base coat) film
12 Clear coat film

The invention claimed is:

1. A room temperature curable solvent-borne coating material, comprising:
a lipophilic polyrotaxane and a resinous component, the polyrotaxane including a cyclic molecule, a linear molecule piercing through the cyclic molecule, and blocking groups disposed at both end terminals of the linear molecule to prevent departure of the cyclic molecule,
wherein at least one of the linear molecule and the cyclic molecule has a hydrophobic modification group which is at least one selected from the group consisting of alkyl group, benzyl group, benzene derivative-containing group, acyl group, silyl group, trityl group, tosly group, and groups bonded through a urethane bond, ester bond or ether bond, thereby exhibiting hydrophobicity;
wherein the resinous component is at least one selected from the group consisting of polyvinyl alcohol, polyvinyl pyrrolidone, poly(meth) acrylic acid, cellulose-based resin, polyacryl amide, polyethylene oxide, polyethylene oxide, polyethylene glycol, polypropylene glycol, polyvinyl acetal-based resin, polyvinylmethyl ether, polyamine, polyethylene imine, casein, gelatin, starch, polyolefin-based resin, a copolymer resin of these with other olefin-based monomers, polyester resin, polyvinyl chloride resin, polystyrene-based resin, acrylic resin, polycarbonate resin, polyurethane resin, vinyl chloride-vinyl acetate copolymer resin, polyvinyl butyral resin, polyisobutylene, polytetrahydrofuran, polyaniline, acrylonitrile-butadiene-styrene copolymer (ABS resin), polyamides, polyimides, polydienes, polysiloxanes, polysulfones, polyiminies, polyacetic anhydrides, polyureas, polysulfides, polyphosphazenes, polyketones, polyphenylenes, polyhaloolefins, and derivatives thereof having at least one additional hydroxyl group, amino group, carboxyl group, epoxy group, vinyl group, thiol group, or photocross-linking group.

2. A room temperature curable solvent-borne coating material, as claimed in claim 1,
wherein the hydrophobic modification group has been modified to include a reaction product with ε-caprolactone.

3. A room temperature curable solvent-borne overcoating coating material, as claimed in claim 2,
wherein the hydrophobic modification group has been modified to include a reaction production with ε-caprolactone and propylene oxide.

4. A room temperature curable solvent-borne coating material, as claimed in claim 2,
wherein a modification degree of the cyclic molecule with the hydrophobic modification group is not less than 0.02 on assumption that maximum number of modifiable hydroxyl groups that the cyclic molecule has is 1.

5. A room temperature curable solvent-borne coating material, as claimed in claim 1,
wherein an inclusion amount of the cyclic molecule is within a range of 0.06 to 0.61 on the assumption that the maximum inclusion amount to which the linear molecule can include the cyclic molecule is 1.

6. A room temperature curable solvent-borne coating material, as claimed in claim 1,
wherein the linear molecule has a weight average molecular weight within a range of from 1,000 to 70,000.

7. A room temperature curable solvent-borne coating material, as claimed in claim 1,
wherein the cyclic molecule includes at least one cyclodextrin selected from the group consisting of α-cyclodextrin, β-cyclodextrin and γ-cyclodextrin.

8. A room temperature curable solvent-borne coating material as claimed in claim 1,
wherein content of the lipophilic polyrotaxane is within a range of from 1 to 100% by mass, relative to a film-forming component.

9. A room temperature curable solvent-borne coating material as claimed in claim 1,
wherein the room temperature curable solvent-borne coating material further comprises at least one of an additive, a pigment, a glittering agent and a solvent.

10. A room temperature curable solvent-borne coating material as claimed in claim 1,
wherein the room temperature curable solvent-borne coating material is at least one of a lustering coating material and a delustering coating material.

11. A room temperature curable solvent-borne coating material as claimed in claim 1,
wherein the room temperature curable solvent-borne coating material is at least one of a clear coat material, a base coat material and an enamel coat material.

12. A coating film comprising:
a room temperature curable solvent-borne coating material as claimed in claim 1,
wherein the coating film is formed by solidifying the room temperature curable solvent-borne coating material.

13. A laminated coat film comprising:
a base coat film; and
a clear coat film obtained by using a room temperature curable solvent-borne coating material as claimed in claim 1,
wherein the laminated film is formed by coating the base coat film and the clear coat on an article in order.

14. A laminated coat film as claimed in claim 13, further comprising an undercoating film formed between the article and the base coat film.

15. A laminated coat film comprising:
a base coat film obtained by using a room temperature curable solvent-borne coating material as claimed in claim 1; and
a clear coat film,
wherein the laminated film is formed by coating the base coat film and the clear coat film on an article in order.

16. A laminated coat film as claimed in claim 15, further comprising an undercoating film formed between the article and the base coat film.

17. A laminated coat film comprising:
an enamel coat film obtained by using a room temperature curable solvent-borne coating material as claimed in claim 1, the enamel coat film being formed on an article.

18. A laminated coat film as claimed in claim 17, further comprising an undercoating film formed between the article and the enamel coat film.

19. A laminated coat film comprising:
a base coat film obtained by using a room temperature curable solvent-borne coating material as claimed in claim 1; and
a clear coat film obtained by using the room temperature curable solvent-borne coating material,
wherein the laminated film is formed by coating the base coat film and the clear coat film on an article in order.

20. A laminated coat film as claimed in claim 19, further comprising an undercoating film formed between the article and the base coat film.

* * * * *